US010750857B1

(12) United States Patent
Baker et al.

(10) Patent No.: US 10,750,857 B1
(45) Date of Patent: Aug. 25, 2020

(54) LIGHTWEIGHT NON-COMBUSTIBLE DECORATIVE MANTEL

(71) Applicants: Michael T. Baker, Germantown, TN (US); Gener J. Yuson, Ho Chi Minh (VN)

(72) Inventors: Michael T. Baker, Germantown, TN (US); Gener J. Yuson, Ho Chi Minh (VN)

( * ) Notice: Subject to any disclaimer, the term of this patent is extended or adjusted under 35 U.S.C. 154(b) by 0 days.

(21) Appl. No.: 16/246,458

(22) Filed: Jan. 12, 2019

(51) Int. Cl.
*A47B 47/00* (2006.01)
*H02B 1/30* (2006.01)
*F24B 1/198* (2006.01)

(52) U.S. Cl.
CPC .............. *A47B 47/00* (2013.01); *F24B 1/198* (2013.01); *H02B 1/301* (2013.01)

(58) Field of Classification Search
CPC ......... A47B 47/00; H02B 1/301; F24B 1/191; F24B 1/198
USPC ............................... 52/36.3; 312/265.1–265.4
See application file for complete search history.

(56) References Cited

U.S. PATENT DOCUMENTS

| | | | | |
|---|---|---|---|---|
| 2,710,784 A * | 6/1955 | Morin | ..................... | A47B 47/03 312/265.1 |
| 2,992,055 A * | 7/1961 | Kass | ..................... | A47B 17/003 312/108 |
| 3,498,654 A * | 3/1970 | Diaz | ..................... | F16B 7/00 248/188.1 |
| 3,605,719 A * | 9/1971 | Andrews | ................. | F24B 1/192 126/550 |
| 3,729,113 A * | 4/1973 | Lopatka | ................. | A47B 47/00 220/480 |
| 4,040,694 A * | 8/1977 | Lascarrou | ............. | A47B 47/03 312/263 |
| 4,045,104 A * | 8/1977 | Peterson | ................ | A47B 47/03 211/182 |
| 4,945,692 A * | 8/1990 | Gallier | .................. | E04F 19/005 52/315 |
| 5,097,771 A * | 3/1992 | James, III | ............. | A47B 23/00 108/108 |
| 5,119,603 A * | 6/1992 | Jones | ..................... | F24B 1/198 52/211 |
| 5,639,150 A * | 6/1997 | Anderson | ............ | A47B 96/145 312/265.2 |
| 5,938,302 A * | 8/1999 | Anderson | ............ | A47B 96/145 312/198 |
| 6,056,375 A * | 5/2000 | Tidmore | ............. | A47B 81/068 312/237 |
| 9,121,188 B2 * | 9/2015 | von Bereghy | .......... | A47B 3/06 |
| 2003/0049575 A1 * | 3/2003 | Lyons | ..................... | C04B 28/24 431/125 |

(Continued)

*Primary Examiner* — Paola Agudelo
(74) *Attorney, Agent, or Firm* — Spilman Thomas & Battle PLLC; William P. Smith (57) ABSTRACT

A decorative mantel article for placement above and/or around a fireplace that is lightweight for facilitation of transport and placement is provided. Additionally, the decorative mantel exhibits a non-combustible quality heretofore undeveloped within the mantel industry, particularly for such articles that are provided with decorative aesthetic designs. Such a lightweight article is provided with all non-combustible components with dimensionally stable structural benefits for long-term mounting and usage, thereby providing a sufficiently strong mantel with a low overall weight measurement. A mounting component is further encompassed herein, as well.

18 Claims, 7 Drawing Sheets

(56) References Cited

U.S. PATENT DOCUMENTS

| | | | | |
|---|---|---|---|---|
| 2003/0189142 | A1* | 10/2003 | Wells | F24B 1/198 |
| | | | | 248/164 |
| 2004/0237417 | A1* | 12/2004 | Rupp | F24B 1/191 |
| | | | | 52/36.3 |
| 2005/0193640 | A1* | 9/2005 | Schiedegger | E04F 19/00 |
| | | | | 52/36.3 |
| 2006/0021287 | A1* | 2/2006 | Warren | E04F 19/005 |
| | | | | 52/36.3 |
| 2007/0257585 | A1* | 11/2007 | Kenny | A47B 47/02 |
| | | | | 312/265.4 |
| 2008/0272677 | A1* | 11/2008 | Francisquini | H02B 1/301 |
| | | | | 312/257.1 |
| 2009/0205263 | A1* | 8/2009 | Heath | E04F 19/005 |
| | | | | 52/36.3 |
| 2011/0089254 | A1* | 4/2011 | Hurtado | F24B 1/198 |
| | | | | 239/18 |

\* cited by examiner

LIGHTWEIGHT NON-COMBUSTIBLE DECORATIVE MANTEL

FIELD OF THE INVENTION

The disclosure relates to a decorative mantel article for placement above and/or around a fireplace that is lightweight for facilitation of transport and placement. Additionally, the decorative mantel exhibits a non-combustible quality heretofore undeveloped within the mantel industry, particularly for such articles that are provided with decorative aesthetic designs. Such a lightweight article is provided with all non-combustible components with dimensionally stable structural benefits for long-term mounting and usage, thereby providing a sufficiently strong mantel with a low overall weight measurement. A mounting component is further encompassed herein, as well.

BACKGROUND OF THE INVENTION

Fireplaces have long been utilized within different edifices, whether domiciles, restaurants, barns, and the like, in order to provide a heat source therein, as well as potentially an aesthetic value for such a location. In any event, with the adoption of fireplaces, structures have also been developed to allow for placement of articles above and/or around such fireplaces, such as the ubiquitous Christmas stocking, clocks, and other articles. Likewise, such structures, referred to generally as mantels, may provide other benefits other than simply display locations for articles, but also aesthetic characteristics (such as matching or aligning with patterns or other designs within the subject room) to allow for a more pleasing interior design effect overall. Long, then, have mantels been adopted and utilized for such purposes.

Such mantels have proven beneficial, as noted above, but have also exhibited certain drawbacks if not problems with long-term adoption. Such issues arise generally due to the utilization of particularly heavy constituents within such mantel articles, namely stone, dense wood, even underlying cement and other high weight objects and materials. Such an article must extend perpendicularly, at least generally, from a wall and, particularly if only a mantel shelf structure is present, must withstand the stresses and pressure involved with high weight articles extending in such a fashion, ostensibly for the lifetime of such article's utilization (which may be 10 years or more). Likewise, then, such structures must not only remain structurally sound and in place extending from a wall but may also require the additional heft of articles placed thereon during utilization, further straining the capabilities of such a mantel shelf. Reduction of weight without also losing structural integrity is thus a desired result in this industry. To date, however, such a concern has been left unexamined to a great extent, primarily due to the lack of providing authentic materials (again, heavy stone, cement, wood, etc.) or at least acceptable substitutes therefor without compromising the overall look and capability of such a mantel shelf article overall. There have been less expensive mantel structures provided within the industry, but such products have suffered from a lack of effective strength and/or unacceptable aesthetics for widespread utilization.

Of further concern within the mantel industry is one that has only recently drawn a certain level of attention. Fire retardant, or non-combustible, materials have gained significant consideration for different structures, particularly homes (domiciles), and the like. Although there is no definitive requirement that a mantel exhibit a certain non-combustible level, the trend appears to be headed in such a direction, specifically with the drive for overall non-combustible materials and end-products for improved safety overall. In actuality, the only non-combustible types of mantels (or shelves, for that matter) include incredibly heavy materials (as noted above, stone, concrete, cement, etc.), although such articles are not marketed or even measured for such non-combustible characteristics. As such, and with no other mantel industry contributor viewing or considering such a non-combustibility issue with regard to fireplace mantel articles, there is a significant need for such a product. Of course, the proximity to fire further increases the attention needed for this endeavor. Thus, combining a low-weight article with one that exhibits a non-combustible level (at least a mantel that will not burn after exposure to fire; cracking or otherwise losing a small degree of structural integrity is possible, but, again, the overall article will not actually burn) has heretofore been unexplored within this industry. With such concerns, there exists a definite need to provide a light-weight and non-combustible mantel within this area; to date, however, and as noted above, no such developments have been worked upon, let alone actually made.

Advantages and Brief Summary of the Invention

A distinct advantage of the mantel described herein is the simultaneous low-weight and non-combustible characteristics. Another advantage thereof is the ease provided for transport (particularly when transported in bulk) as well as installation. Yet another advantage is the increase in safety for the user in terms of not only such an installation consideration, but also the reliability of such an article to withstand high temperatures and thus reduce the propensity of the spread of fire within an edifice in relation to such a mantel.

Accordingly, the inventive decorative mantel comprises all non-combustible materials, wherein said materials comprise: a) a three-dimensional metal framework having a top, bottom, two short sides, and two long sides, b) a lightweight resilient board structure, and c) an adhesive; wherein said lightweight resilient board structure is contacted and attached to said metal framework by said adhesive; wherein said board structure covers all but one long side of said metal framework; and wherein said metal framework includes extensions therein within said uncovered long side such that said extensions provide attachment means for mounting to a wall. Furthermore, the overall mantel (shelf) article may exhibit a range of densities (weight per length) of 1.5 to 3.5 grams per cubic foot, more preferably from 2.0 to 3.0 grams per cubic foot, and most preferably about 2.4-2.6 grams per cubic foot. As well, the level of non-combustibility of the overall mantel (shelf) exhibits no immolation or flammability up to X1,995° C. (Celsius) for at least 30 minutes of exposure, preferably at least 60 minutes, with only a potential loss of dimensional stability (such as cracking and/or slight deformations) upon exposure at such a high temperature over such a time frame.

The disclosure thus provides a resilient, lightweight, and non-combustible mantel article that can be installed as needed or as desired on and/or to a wall of any type in order to provide a display surface or other like product. The three-dimensional structure of the framework may be of a standard shelf shape, being, as is well known and understood, a flat structure having a depth of a certain measured distance, a length, and a width, wherein the width is typically smaller than the length and the depth is less in measure than the width. Such dimensions are provided, as examples, within a range of 3:1 to 10:1 in measured distances, as it concerns length to width. Likewise, the depth (z-axis, as opposed to x-axis for the length and y-axis for the width), is roughly 4:1 to 10:1 in relation to width to depth comparisons. In terms of actual distances, the length may be from 1.5 feet to 5 feet, the width from 3 inches to 6 inches, and the depth from 1 inch to 3 inches. In any event, the internal three-dimensional metal framework provides the basic structural outline to be followed in this respect, with a skeleton-like frame for such a purpose. As alluded to previously, the framework will supply the basis for a top surface, a bottom surface, two short side surfaces, and two long side surfaces, with the two coupled sides being parallel to one another (short side opposite to short side, long side opposite to long side). The framework thus will have a general structure of one or a plurality of lengthwise bars (preferably with squared cross-sectional shapes, although other geometric shapes may be employed if so desired) in each direction. Thus, for, for example, the length of the top surface, parallel opposing bars are provided, either as a single bar structure or two or more in series but connected to one another to form a straight complete bar for both front and back edges of the top surface portion. The same would thus be in effect for the bottom surface portion. The width is thus determined in relation to the distance between the two top and bottom surface portions, separated by cross bars at least aligned along the edges of the short sides of the framework. The same type of squared cross-sectional bar may be employed for such a purpose. Additionally, then, to allow for increased shear stress levels for the finished mantel product, a plurality of such cross bars may be utilized with some if not all separated at uniform distances from one another. More than one or two may be employed at either end of the framework, if desired, as well, to allow for greater strength increases at such opposing ends (e.g., the two opposing ends of the lengthwise shelf structure at the short sides thereof). Additionally, then, to provide the needed depth to the overall mantel shelf structure, the framework may include posts at the two ends as well at the same position as the cross bars, noted above, all in order to provide structural strength and in the direction perpendicular to the cross bars as well as length wise bars (in essence, creating the z-axis depth dimension to the mantel shelf). Such framework structural components may thus be provided as a single three-dimensional frame or constructed with the different bar components through soldering, etc., as needed. In either manner, the outer surfaces of such framework constituents should be substantially planar and smooth to allow for flat board attachment. One of the upper lengthwise bars will also include extensions that allow for simplified attachment to a mounting tool that may be first introduced within a wall (or like structure). The extensions may be complementary in shape, structure, and strength to properly connect with such a mounting apparatus such that the entirety of the mantel remains in place upon such a connection between extensions and mounting device. Such extensions may be, for example, of any geometric shape, although the strength and lack of movement accorded through utilization of a square structure is potentially preferred. These extensions may extend downward from the top surface frame portion within the same plane as the frame or, in some circumstances, may extend not only downward from the top surface frame portion but also away from the same frame portion plane. This allows for the employment of a straight planar component to associate with a similarly structured mounting device or with a slight angle to allow for a similarly situated mounting apparatus shape. The overall goal, of course, is to provide a mantel that is properly flush with the subject wall for proper placement and balancing with objects placed thereon during actual utilization, as well as proper aesthetics in a clean line fashion.

Such a framework thus must also be constructed of non-combustible materials in order to accord the overall non-flammable characteristics desired. The utilization of a frame in this instance allows for the introduction of other materials that provide a solid base structure for article placement purposes, that may not require more than just placement itself over such a framework. As such, materials that allow for such a framework construction, thus according a lightweight result overall (based mainly upon the covering board materials, but still reliant upon a frame that is lightweight enough for such a system to function as desired), must be non-combustible alone as well as in combination with the other material components noted herein. Metals, such as, without limitation, galvanized iron bars (and frames) allow for such a result. Other possible materials meeting this result include, again, without limitation, . . . .

To provide the beneficial lightweight features, as well as the all-important non-combustible characteristics, and all while still providing an overall structure that exhibits the necessary capability of retaining the external weight of articles placed thereon such a structure during use without appreciable sag or other like physical compromise, a proper material is necessary. Such a material has proven elusive, particularly in terms of determining all of the above requirements, and further with the ability to accord a decorative and aesthetically pleasing overall structure. To that end, it was realized that certain boards made from a mix of Portland cement, silica, and cellulose fibers, combined and sintered into a flat board structure, were of particular unexpectedly good import. Such a material, DIAMONDBOARD (or SMARTBOARD) was incorporated within experimental activities of development in this instance. Such a board was cut properly to accord with the outer dimensions of the framework, provided along the top and bottom surfaces, both short sides, and one long side (leaving the last open, with the hanging extensions uncovered for access purposes). Application to the framework thus covered all but such one long side. The other component required herein, a non-combustible adhesive (such as, without limitation, polyurethane adhesives from 3M and/or Sika) was applied to each of the frame surfaces to which a board was to be contacted and attached. With a frame in place, such adhesive application was thus only to surfaces that would in fact be contacted, thus reducing the amount of adhesive typically required for such a purpose. The finished result thus provided a shelf unit (mantel) with a covered top surface, a covered bottom surface, a front vertical side covered, and two vertical short sides covered with the board material through the adhesive as noted above. This finished structure thus can be allowed to set in terms of the adhesives and then utilized for wall mounting purposes, either alone on a wall or over and/or near a fireplace with the complementary mounting extensions from the open mantel long vertical end engaged securely with a mounting apparatus. The overall structure may further include design work within or on the surface of the board components to allow for any desired decorative result to be included for aesthetic purposes, at least. Thus, a "brick" pattern may be employed on the board surface with a veneer, coating, applique, or the like, as desired to provide such a design on demand. Coupled with the lightweight and non-combustible framework, the lightweight and non-combustible surface boards, and the noncombustible adhesive (as well as, if desired, any type of surface design accoutrement, as noted above), the overall mantel exhibits characteristics that have heretofore been unexplored within this industry. Furthermore, the hollow structure of the mantel itself accords a further beneficial lightweight result as the density of the overall structure is significantly lower than other, much heavier, completely solid non-combustible mantel articles.

Such a mantel article may be provided in any suitable shape, particularly as a stand-alone shelf or in relation to a fireplace. Thus, although a structure is described above as a three-dimensional rectangular shelf shape, such a mantel may be provided as three-dimensional shape including, without limitation, a triangle, a trapezoid, a semi-circle, a partial circle, an arc (with only a portion of such a structure in contact with a subject wall), and the like. Likewise, as alluded to above, any design may be incorporated into the outer (non-wall contacted) surfaces for whatever aesthetic purpose desired. The overall capability of the mantel described herein to retain certain weighted articles (displays, etc.) is limited solely to the maximum weight bearing limitation of the board components. As such, those provided by the types described herein are rather significant and thus should accord up to (and possibly above) 115 pounds total, with a concentrated value of from 1.5 to 3.5 pounds per cubic generally.

These and other aspects of the disclosed subject matter, as well as additional novel features, will be apparent from the description provided herein. The intent of this summary is not to be a comprehensive description of the subject matter, but rather to provide a short overview of some of the subject matter's functionality. Other systems, methods, features and advantages here provided will become apparent to one with skill in the art upon examination of the accompanying FIGURES and detailed description. It is intended that all such additional systems, methods, features and advantages that are included within this description, be within the scope of any claims filed now and/or later.

BRIEF DESCRIPTION OF THE DRAWINGS

The novel features believed characteristic of the disclosed subject matter will be set forth in any claims that are filed now and/or later. The disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

Reference now should be made to the drawings, presented as non-limiting possible embodiments in accordance with the descriptions provided above. The ordinarily skilled artisan would fully understand the breadth and scope intended herein in relation to the following potentially preferred types.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
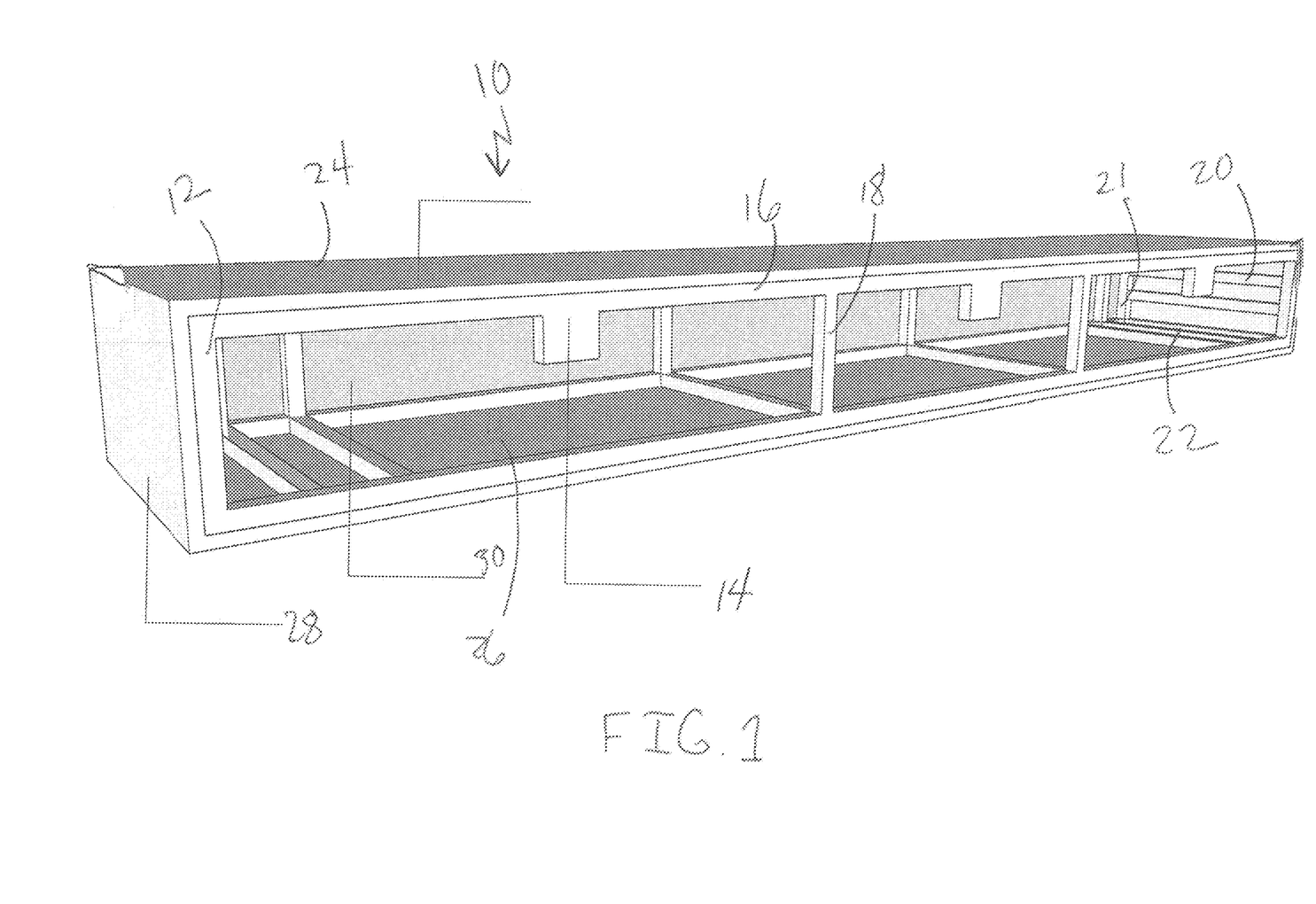
FIG. 1 depicts a perspective rear view of a mantel shelf in accordance with embodiments.

FIG. 1 depicts a side perspective rear view of the mantel shelf 10 as disclosed herein. A frame 12 is shown with mounting extensions 14, horizontal lengthwise bars 16, vertical cross bars 18, horizontal cross bars 20, vertical side bars 21, and end-situated weight-bearing bars 22. To such a frame is applied a top lightweight non-combustible board 24, a bottom board 26, two side vertical boards 28 and a front vertical board 30. The opening 32 thus allows for lowered overall density of the mantel 10 and access to the mounting extensions 12 for wall installation purposes.

Figure 2:
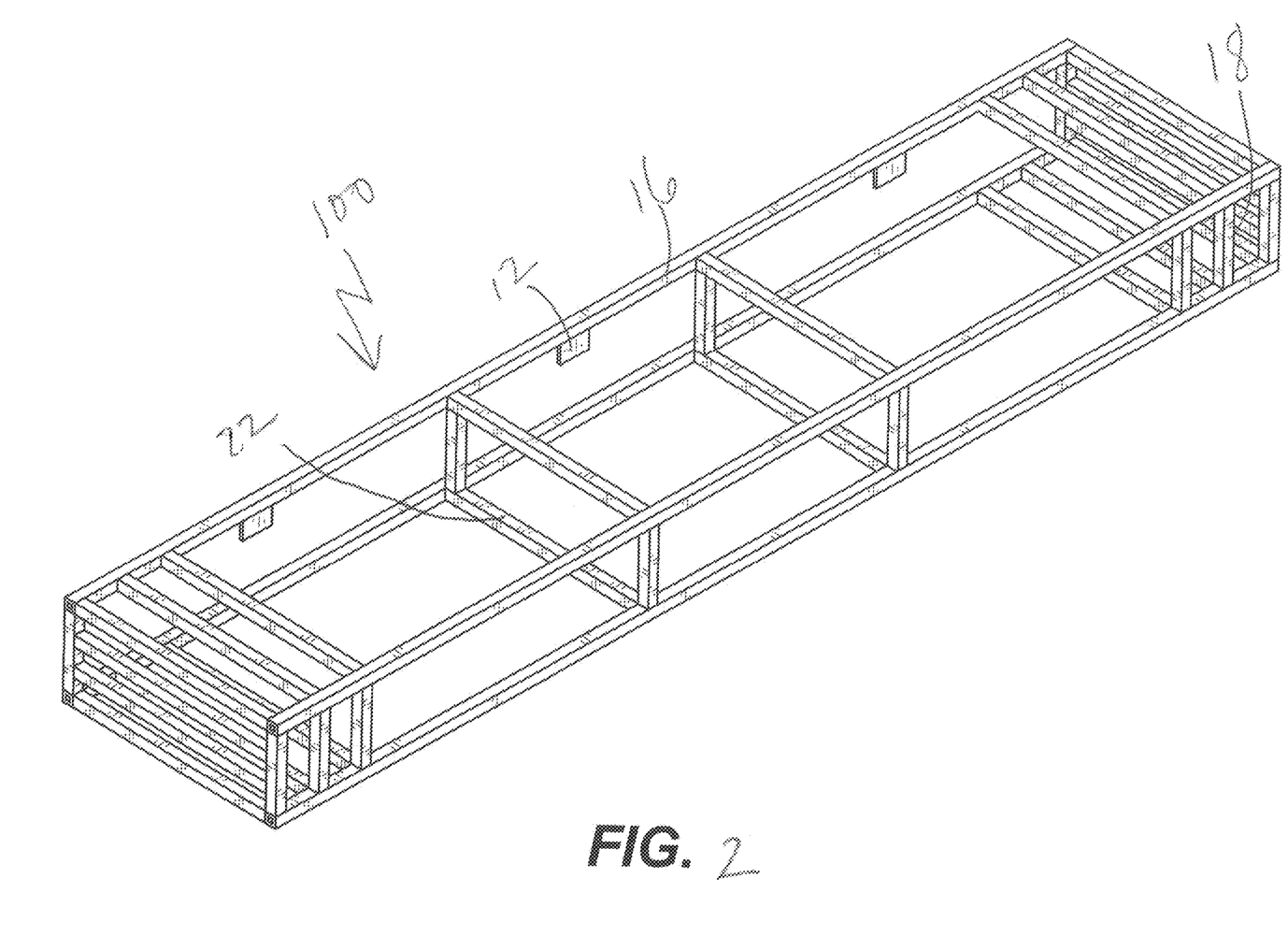
FIG. 2 depicts a side view of a vertical frame component of FIG. 1 with mounting extensions in accordance with embodiments.
Figure 3:
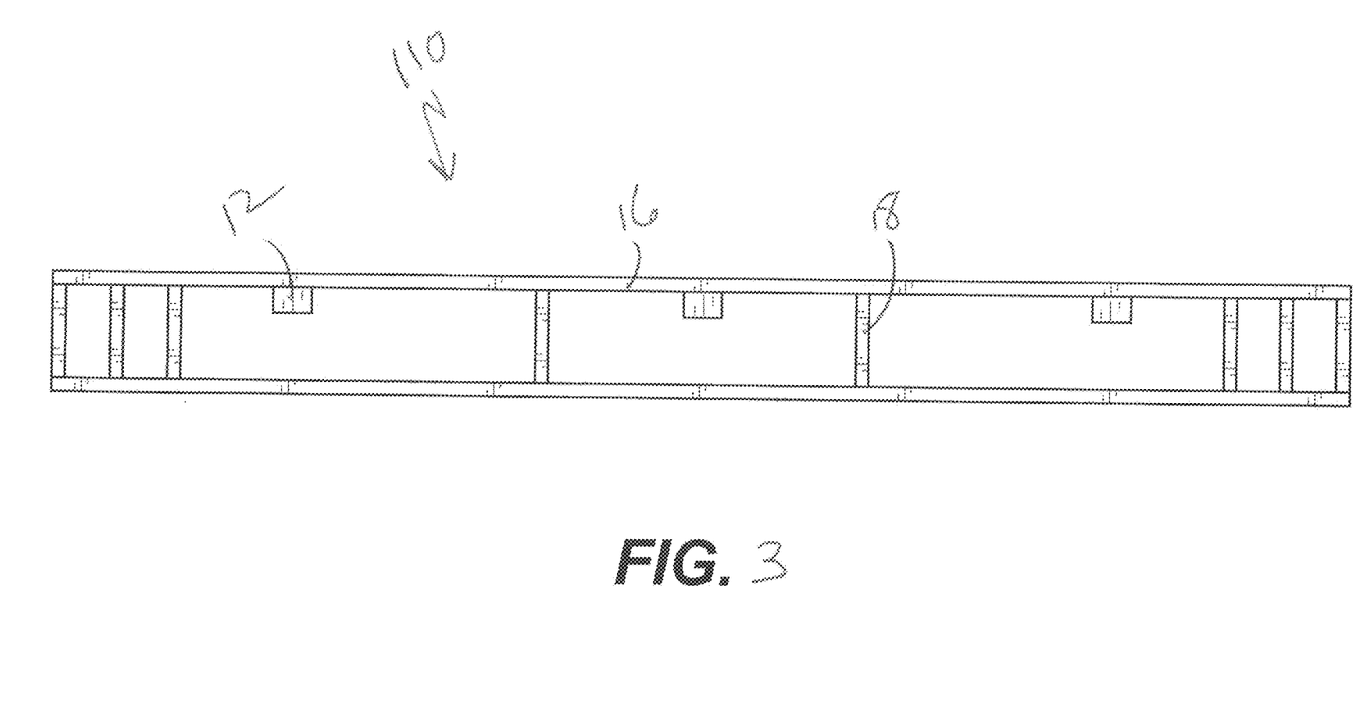
FIG. 3 depicts a side view of the opposite vertical frame component of FIG. 1 in accordance with embodiments.
Figure 4:
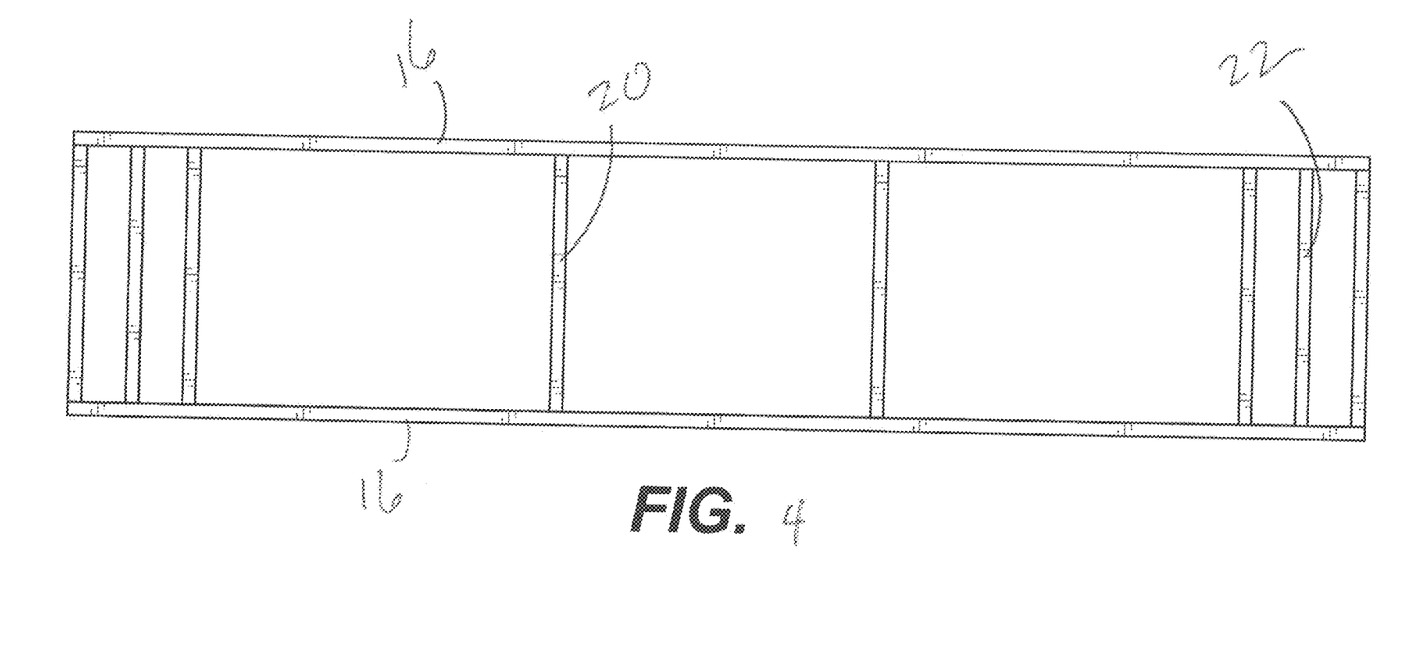
FIG. 4 depicts a top view of a horizontal top frame component of FIG. 1 in accordance with embodiments.
Figure 5:
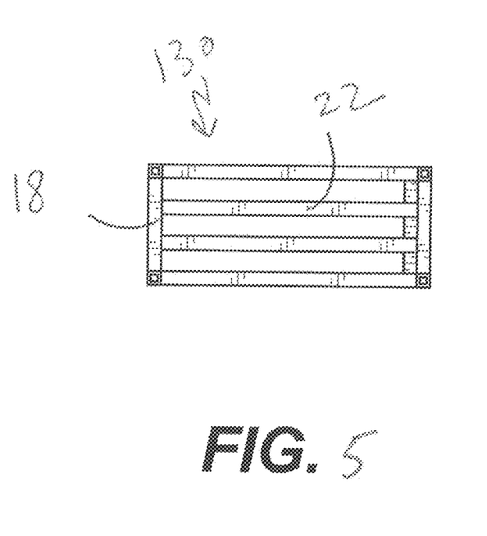
FIG. 5 depicts a side view of a frame component of FIG. 1 in accordance with embodiments.
Figure 6:
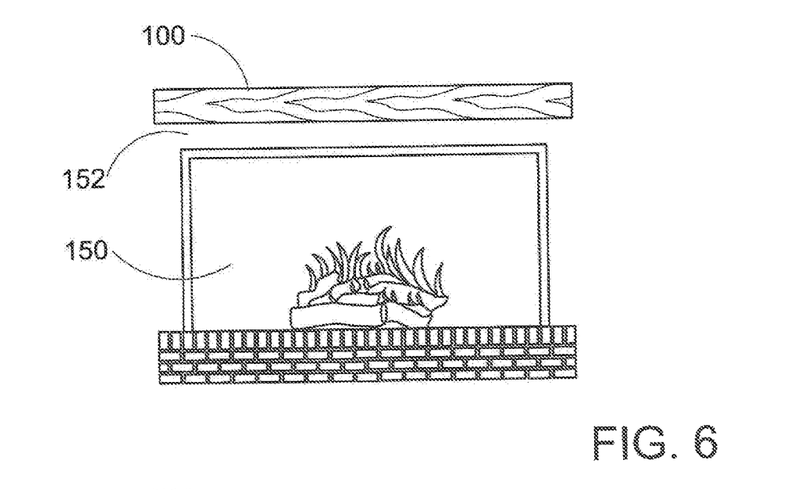
FIG. 6 depicts the mounted mantel shelf of FIG. 1 over a fireplace.
Figure 7:
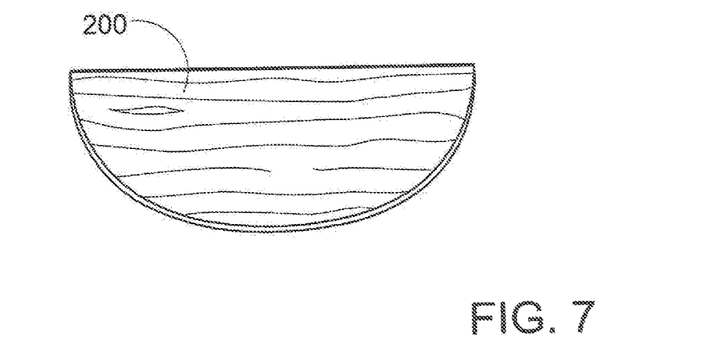
FIG. 7 depicts a semi-circle shaped mantle shelf in accordance with embodiments.

FIG. 2 shows one vertical frame component 100 including horizontal lengthwise bars 16, vertical cross bars 18, and mounting extensions 12. FIG. 3 shows a different vertical frame component 110 having horizontal lengthwise bars 16, and vertical cross bars 18. FIG. 4 shows a horizontal frame component 120 having lengthwise (horizontal) bars 16, horizontal cross bars 20, and end-situated weight-bearing bars 22. FIG. 5 shows a side view of a vertical side frame component 130 having vertical cross bars 18 and end-situated weight-bearing bars 22. Such a structure as shown in portions as FIGS. 2-5 is present within the mantel depicted within FIG. 1. FIG. 6 shows the mantel of FIG. 1 (and that of FIGS. 2-5, for that matter) installed on a wall 152 over a fireplace 150 (such as connected with the mounting bracket of FIG. 8, as one possible embodiment). FIG. 7 thus shows a different geometrically shaped mantel 200 (semi-circle in shape) installed as in FIG. 6.

Figure 8:
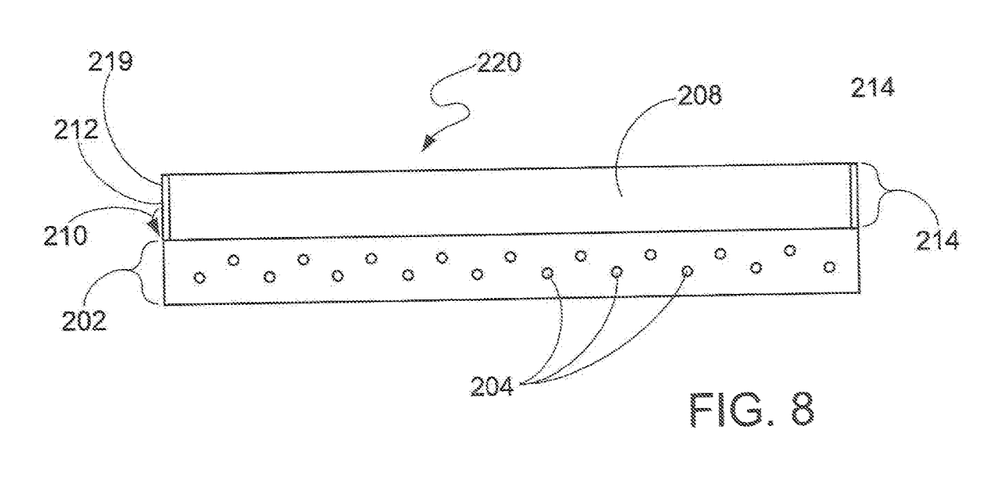
FIG. 8 depicts a side view of a potentially preferred embodiment of a mounting bracket utilized in conjunction with the mantel shelf of FIG. 1 and complementary in shape with the mounting extensions thereof.
Figure 9:
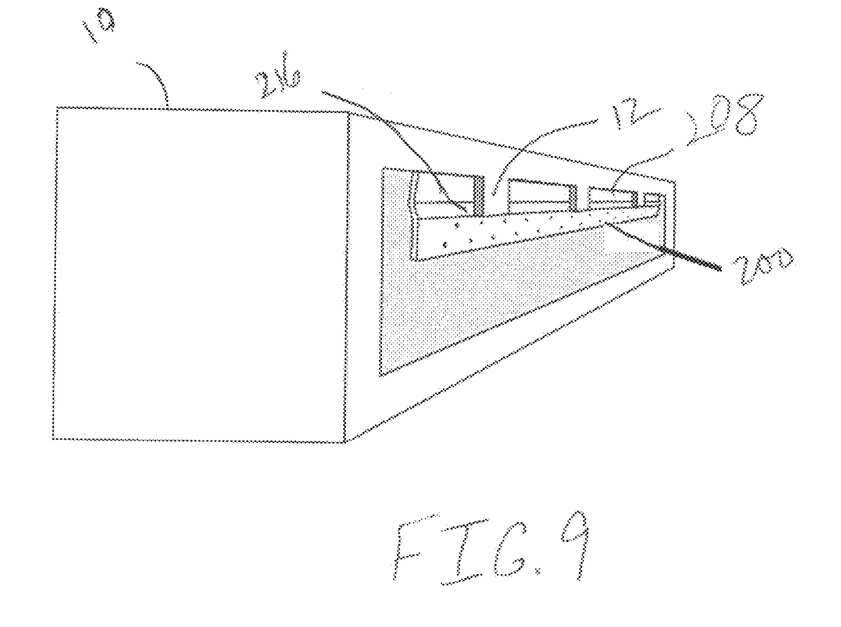
FIG. 9 depicts a side perspective view of the mounting bracket of FIG. 8 as contacted for secure retention with the mantel shelf of FIG. 1.

FIG. 8 shows a potentially preferred mounting bracket 200 that is a horizontally configured rail with a lower longitudinal straight-line component 202 (elongated rectangular shape in this embodiment) including multiple openings 204 in staggered geometric configurations for introduction of nails, studs, brads, screws, and the like (not illustrated), at any selected location as provided that permits such secured wall mounting thereof (such as in FIG. 9). The upper component 206 of the mounting bracket thus includes a flange 208 that extends upwards at an initial angle 210 (anywhere from 5 to 45 degrees from the lower component 202 plane) and then turns at another angle 212 (complementary to the initial angle, potentially preferably) to provide a substantially parallel rectangular straight-line component 214 in relation to the lower component 202. Such an initial angle 210 provides an insert 216 along the entirety of the hanger rail (mounting bracket) 200 for placement of the mounting extensions (12 of FIG. 2, for instance) of the mantel shelf (10 of FIG. 1, as well as FIG. 9). In this manner, as shown in FIG. 9 (as well as FIG. 6), a solid attachment of the mounting bracket 200 to a subject wall (such as 152 of FIG. 6)(or other substrate and/or target material for mantel shelf 10 mounting thereon and thereto) is provided that allows for safe, reliable, and secure placement of the mantel shelf 10 for mounting and/or display purposes flush with the target wall so the mantel appears flat in such a configuration.

The mantel of FIG. 1 has been tested in terms of heat and flame exposure. A direct application of a propane flame source resulted in slight discoloration after 5 minutes of exposure and no immolation of the surface. The mantel remained structurally stable and only after 1 hour of exposure exhibited any change, being a crack in the surface. Otherwise, however, the mantel remained structurally sound and did not exhibit any potential to cause fire to flow thereover to any other surface. Additionally, the mantel exhibited sufficient strength to retain significant weight in terms of articles provided, as noted above a range as high as at least 115 pounds on center as well as dead weight (balanced weights of the same minimum amount on top of the mounted shelf). Lastly, the lightweight of the mantel (here with a 48-inch rectangular shelf, for example having a net weight of 27 pounds) allowed for ease in installation as the weight was not too much for one person to lift and mount the mantel as needed. Larger sized rectangular shelves had increased weights, although not so high as to make installation too difficult (for example, a shelf of 60 inches length had a weight of 36 pounds, 72 inches of 42 pounds). Additionally, such lightweight benefits translate to cost reductions in terms of transportation as bulk transport of large numbers within a shingle shipment may be as much as ½ if not less the costs for comparable heavyweight, noncombustible mantel shelves.

Thus, a lightweight non-combustible mantel shelf is provided as described above that may be attached, as desired, on any wall structure to provide a decorative display surface on demand. Such a lightweight article facilitates installation and reduces transportation costs significantly and the non-combustible nature thereof allows for far safer and more acceptable home products in relation to flammability and other like concerns. Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the description herein cover any and all such applications, modifications, and embodiments within the scope of the present invention.

What we claim is:
1. A mantel comprising:
a skeletal bar frame comprising:
  a top frame portion and a bottom portion, each of the top frame portion and bottom frame portion having a pair of long bar members and a pair of short bar members the short bar members connected between the long bar members at opposing ends of the long bar members;
  at least two end connector bars connected between the top frame portion and bottom frame portion to form the skeletal bar frame defining a three dimensional rectangle;
a first board portion and a second board portion fastened to a respective exterior side of the top and bottom portions;
a first end board portion and a second end portion board fastened to the end connector bars at respective opposing ends;
a front board portion attached between a front side of the skeletal bar frame between the top and bottom frame portions and the respective end connector bars;
the top and bottom portions and end connector bars defining a hollow cavity with an open side disposed opposite the front board portion;
the open side having at least one tab members for engaging a mounting strip;
wherein the mounting strip is attachable to a flat vertical surface for supporting the mantel;
wherein the respective first and second board portions and first and second end board portions comprise a mix of Portland cement, silica, and cellulose fibers, combined and sintered into a flat board structure.

2. The mantel of claim 1, wherein the top and bottom frame portions are rectangular.

3. The mantel of claim 1, wherein the top and bottom frame portions are planar.

4. The mantel of claim 1 wherein the flat board structure has a density in a range of 53 grams per cubic meter (g/m$^3$) to 123.7 g/m$^3$.

5. The mantel of claim 1, wherein the mantel is non-combustible when exposed to temperatures up to 1,995° Celsius.

6. The mantel of claim 1, wherein the at least one tab members are arranged to support the mantel projecting from the vertical surface by engaging a flange extending upwardly from the mounting strip.

7. The mantel of claim 1, wherein each board portion fastened to the skeletal frame with a non-combustible polyurethane adhesive.

8. The mantel of claim 7, wherein the adhesive is applied to each of the frame surfaces to which at least one of the board portions is contacted and attached.

9. A mantel comprising:
a metal framework comprising:
  a top horizontal portion and a bottom horizontal portion, a pair of short vertical side portions, and a front vertical side portion and a rear vertical side portion, the front vertical side portion and the rear vertical side portion connected at opposite ends by the short vertical side portions, respectively;
a plurality of board structures adhesively attached to the top horizontal portion, bottom horizontal portion, end portions and front vertical side portion to define a hollow five-sided enclosure open at the rear vertical side portion;

the rear vertical side having at least one extension tab protruding downward from the top horizontal portion for removably attaching the mantel to a flange;

wherein attachment to the flange supports the mantel extending from a flat vertical surface; and wherein the plurality of board portions comprise a mix of Portland cement, silica, and cellulose fibers, combined and sintered into a flat board structure.

10. The mantel of claim 9, wherein the metal framework comprises a three dimensional geometric shape.

11. The mantel of claim 10, wherein the geometric shape is selected from one of a rectangular shape, a triangular shape and a semi-circular shape.

12. The mantel of claim 9, wherein the top and bottom frame portions are planar.

13. The mantel of claim 9, wherein the flat board structure has a density in a range of 53 grams per cubic meter ($g/m^3$) to 123.7 $g/m^3$.

14. The mantel of claim 13, wherein the mantel is non-combustible when exposed to temperatures up to 1,995° Celsius.

15. The mantel of claim 9, wherein the at least one tab members are arranged to support the mantel projecting from the vertical surface by engaging a flange extending upwardly from the mounting strip.

16. The mantel of claim 9, wherein each board portion fastened to the skeletal frame with a non-combustible polyurethane adhesive.

17. A mantel comprising:

a three dimensional framework having a hollow interior and an opening;

the opening comprising tab members for engaging a flange portion of a mounting strip;

the three dimensional framework enclosed on five sides by a flat board structure comprised of a mix of Portland cement, silica, and cellulose fibers, combined and sintered into the flat board structure.

18. The mantel of claim 17, wherein the flat board structure has a density in a range of 53 grams per cubic meter ($g/m^3$) to 123.7 $g/m^3$; and wherein the mantel is non-combustible when exposed to temperatures up to 1,995° Celsius.

* * * * *